(12) United States Patent
Lee (10) Patent No.: US 9,900,500 B2
(45) Date of Patent: Feb. 20, 2018

(54) METHOD AND APPARATUS FOR AUTO-FOCUSING OF AN PHOTOGRAPHING DEVICE

(71) Applicant: Samsung Electronics Co., Ltd., Suwon-si, Gyeonggi-do (KR)

(72) Inventor: Jangwon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

(21) Appl. No.: 14/289,012

(22) Filed: May 28, 2014

(65) Prior Publication Data
US 2014/0354874 A1    Dec. 4, 2014

(30) Foreign Application Priority Data
May 30, 2013  (KR) .................. 10-2013-0061782

(51) Int. Cl.
*H04N 5/232*   (2006.01)
*G02B 7/28*    (2006.01)
*G03B 13/36*   (2006.01)

(52) U.S. Cl.
CPC .......... *H04N 5/23222* (2013.01); *G02B 7/28* (2013.01); *G03B 13/36* (2013.01); *H04N 5/23212* (2013.01)

(58) Field of Classification Search
CPC ............. H04N 5/23212; H04N 5/2356; H04N 5/3696; H04N 5/144; G03B 13/32; G03B 13/34; G03B 13/36; G03B 3/10; G03B 3/12; G03B 3/02; G03B 3/04; G03B 3/06; G03B 13/20; G02B 7/04; G02B 7/09; G02B 7/10; G02B 7/102; G02B 7/105; G02B 7/28; G02B 7/285; G02B 7/34; G02B 7/343; G02B 7/346; G02B 7/32; G02B 7/40; G02B 7/36; G01C 3/00; G01C 3/06; G01C 3/08; G01C 3/085; G01S 17/08; G01S 17/48; G06T 2207/10148; G06T 5/003; G06T 5/004
USPC .................................................. 348/345–356
See application file for complete search history.

(56) References Cited

U.S. PATENT DOCUMENTS

| 4,697,904 | A | * | 10/1987 | Takahashi ............. G02B 7/32 250/351 |
| 5,737,646 | A | * | 4/1998 | Nakajima ............. G02B 7/28 355/41 |
| 7,499,095 | B2 | | 3/2009 | Kwon et al. |
| 2008/0050108 | A1 | * | 2/2008 | Mizutani ............. G02B 7/36 396/104 |

(Continued)

FOREIGN PATENT DOCUMENTS

| JP | 2004-129927 A | 4/2004 |
| JP | 2008-124846 A | 5/2008 |

(Continued)

*Primary Examiner* — Nelson D. Hernández Hernández
(74) *Attorney, Agent, or Firm* — Jefferson IP Law, LLP (57) ABSTRACT

An auto-focusing method of an electronic device is provided. The auto-focusing method includes collecting sensor information using a plurality of sensors of the electronic device when a camera of the electronic device is driven, determining at least one focusing sensor, from among the plurality of sensors, based on the collected sensor information, and focusing on a subject located in an image collected from the camera using the at least one determined focusing sensor.

17 Claims, 5 Drawing Sheets

(56) References Cited

U.S. PATENT DOCUMENTS

2010/0002084 A1\* 1/2010 Hattori ................. G11B 27/034
  348/207.1
2010/0134642 A1\* 6/2010 Thorn .................... G02B 7/287
  348/222.1

FOREIGN PATENT DOCUMENTS

| JP | 2011-081186 A | 4/2011 |
| JP | 2012-113204 A | 6/2012 |

\* cited by examiner

| SENSOR<br>PHOTOGRAPHING<br>ENVIRONMENT | Image Sensor | Stereo microphone | Eye-direction detector | Face Recognition | Modem (WiFi/3G) | GPS |
|---|---|---|---|---|---|---|
| CHANGE IN ILLUMINATION | ⌒ | | ⌒ | ⌒ | | |
| AMBIENT NOISE | | ⌢ | | | | |
| COMMUNICATION SIGNAL | | | | | ⌣ | ⌣ |
| PHOTOGRAPHING MODE VIDEO | 5 | 4 | 2 | 2 | 6 | 3 |
| PHOTOGRAPHING MODE STILL IMAGE | 5 | 2 | 3 | 3 | 6 | 4 |

<501>

| SENSOR<br>PHOTOGRAPHING<br>ENVIRONMENT | Image Sensor | Stereo microphone | Symbol Recognition | Face Recognition | Modem (WiFi/3G) | GPS |
|---|---|---|---|---|---|---|
| CHANGE IN ILLUMINATION | ⌒ | | ⌢ | ⌒ | | |
| AMBIENT NOISE | | ⌢ | | | | |
| COMMUNICATION SIGNAL | | | | | ⌣ | ⌣ |
| PHOTOGRAPHING MODE VIDEO | 6 | 3 | 2 | 1 | 5 | 2 |
| PHOTOGRAPHING MODE STILL IMAGE | 6 | 1 | 4 | 1 | 5 | 2 |

<502>

METHOD AND APPARATUS FOR AUTO-FOCUSING OF AN PHOTOGRAPHING DEVICE

CROSS-REFERENCE TO RELATED APPLICATION(S)

This application claims the benefit under 35 U.S.C. § 119(a) of a Korean patent application filed on May 30, 2013 in the Korean Intellectual Property Office and assigned Serial number 10-2013-0061782, the entire disclosure of which is hereby incorporated by reference.

TECHNICAL FIELD

The present disclosure relates to an auto-focusing method and apparatus of a photographing device.

BACKGROUND

As communication technologies have developed, electronic devices, for example, a portable terminal such as a smart phone, a tablet Personal Computer (PC), a smart camera, a digital camera, and the like, have become widely utilized. A portable terminal are utilized in a significantly wide field since the portable terminal is convenient to use and easy to carry.

Recently, a camera that provides a performance of high-definition and high-resolution has been contained in a portable terminal and thus, a user's desire for readily photographing a picture and/or a video has been increased. Accordingly, an auto-focusing system has been provided that automatically focuses on a subject without a special manipulation by a user of a camera or a camera application of a terminal.

Generally, an auto-focusing scheme supported in a photographing device includes an infrared auto-focusing scheme, a contrast detection auto-focusing scheme, or a phase difference detection auto-focusing scheme. When a significant amount of reflection occurs, such as reflection from a plane of glass, or when a distance to a subject is far, the infrared auto-focusing scheme is difficult to execute for focusing. The contrast detection auto-focusing scheme executes focusing based on a contrast of a portion of a subject and thus, the contrast detection auto-focusing is difficult to execute when a contrast does not exist in the subject. The phase difference detection auto-focusing scheme generates two images using a lens in a detection sensor and executes focusing using an interval between the images. The phase difference detection auto-focusing scheme has difficulty in executing focusing when light, such as sunlight or a reflected light, enters through a lens or when a subject is significantly small. Therefore, there is a need for a method of effectively executing focusing when a portable terminal equipped with a camera photographs a picture and/or a video.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for auto-focusing of an electronic device. An embodiment of the present disclosure provides a method and apparatus for selecting focusing sensors optimized for an electronic device in a respective environment and/or situation by utilizing various sensors supported in an electronic device, and executing auto-focusing using the selected sensors.

Another aspect of the present disclosure is to provide an electronic device equipped with a camera. Another embodiment of the present disclosure provides a method and apparatus for accurately and promptly focusing on a subject using various sensors, i.e., more than one sensor, supported in an electronic device, as opposed to using a single sensor.

In accordance with an aspect of the present disclosure, an auto-focusing method of a electronic device is provided. The method includes collecting sensor information using a plurality of sensors of the electronic device when a camera is driven, determining at least one focusing sensor, from among the plurality of sensors, based on the collected sensor information, and focusing on a subject located in an image collected from the camera using the at least one determined focusing sensor.

In accordance with another aspect of the present disclosure, a photographing device is provided. The photographing device includes a camera unit configured to collect an image including a subject, a sensor unit configured to collect photographing environment information, and to collect a plurality of pieces of sensor information by processing the photographing environment information, when the camera unit is driven, and a controller configured to collect sensor information using the plurality of sensors, to determine at least one focusing sensor, from among the plurality of sensors, based on the collected sensor information, and to control focusing on a subject located in the image collected from the camera unit using the at least one determined focusing sensor.

In accordance with another aspect of the present disclosure, an electronic device equipped with a camera selects a set of optimized sensors from among various sensors supported in the electronic device based on a camera photographing mode and an ambient environment, and automatically focuses on a subject using the corresponding set of sensors.

In accordance with another aspect of the present disclosure, focusing on a desired subject is promptly and accurately executed in an environment where focusing is difficult, by utilizing sensors included in a terminal without separately changing a physical hardware.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A method and apparatus according to the present disclosure may be applied to a portable terminal. It is apparent that the portable terminal may be a portable terminal, a smart phone, a tablet Personal Computer (PC), a hand-held PC, a Portable Multimedia Player (PMP), a Personal Digital Assistant (PDA), a camera, a portable electronic device, and any other similar and/or suitable electronic device. Hereinafter, descriptions will be provided by assuming that an auto-focusing method and apparatus of an electronic device according to the present disclosure is applied to a portable terminal.

Figure 1:
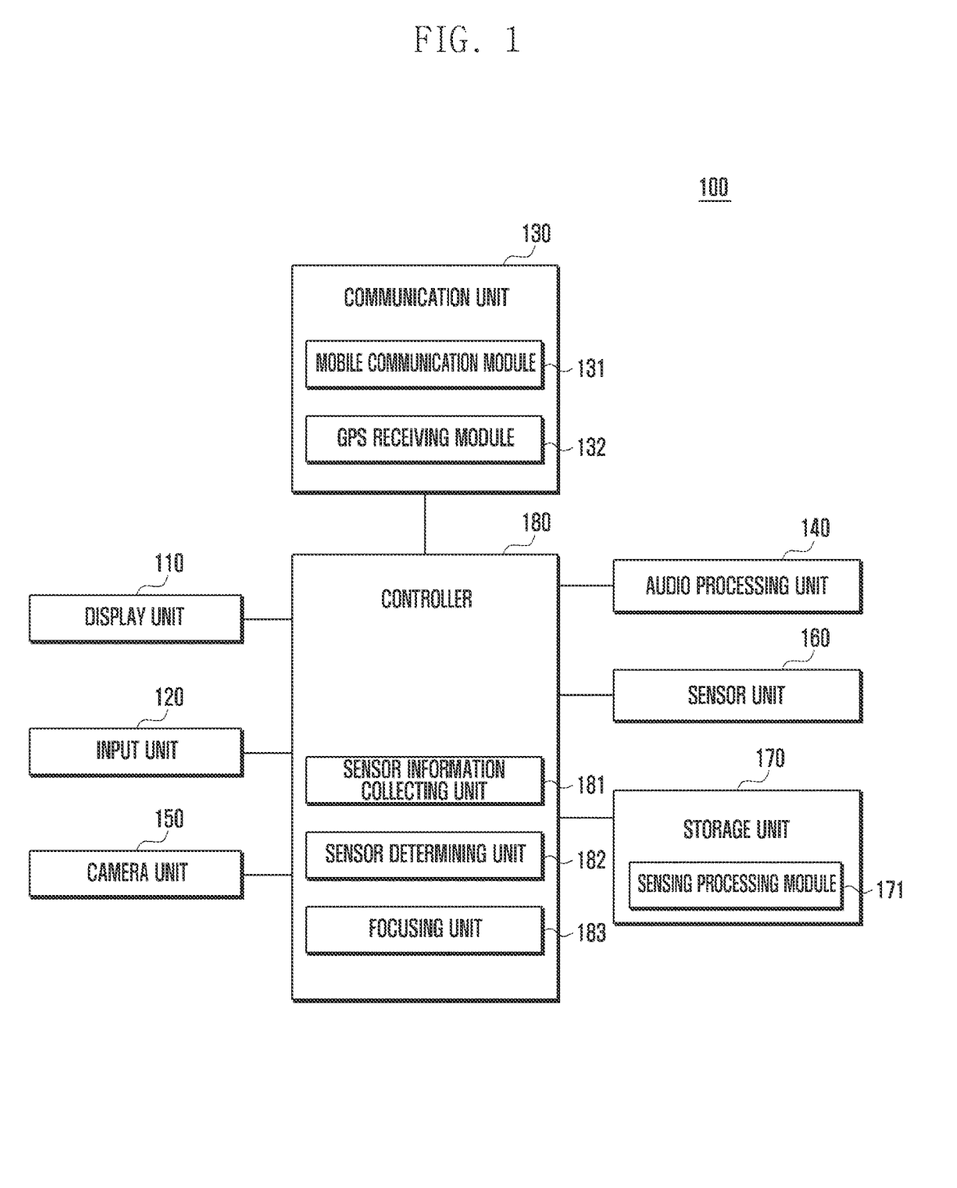
FIG. 1 is a block diagram illustrating a configuration of an electronic device according to an embodiment of the present disclosure.

FIG. 1 is a block diagram illustrating a configuration of an electronic device according to an embodiment of the present disclosure.

Referring to FIG. 1, an electronic device 100 according to the present disclosure is configured to include a display unit 110, an input unit 120, a communication unit 130, an audio processing unit 140, a camera unit 150, a sensor unit 160, a storage unit 170, and a controller 180.

The display unit 110 executes a function of outputting various function screens used for operating the electronic device 100. The display unit 110 supports a function of visually providing a user with a menu, input data, function setting information, and other various information. The display unit 110 may be formed of a Liquid Crystal Display (LCD), an Organic Light Emitting Diodes (OLED), an Active Matrix Organic Light Emitting Diodes (AMOLED), or the like, however, the display unit 110 is not limited thereto and may be any other similar and/or suitable display device.

The display unit 110 may display a photographed image screen obtained through the camera unit 150 when the camera unit 150 is driven. The display unit 110 may display a User Interface (UI) for controlling a camera, together with the photographed image screen. For example, the display unit 110 may display a UI for photographing mode settings, including a shutter speed, an open/close state of an aperture, a white balance, an International Organization of Standardization (ISO) standard for sensitivity to light, application of a filter, and the like, a shutter menu, a picture/video mode switching menu, and a zooming in/out menu, together with the photographed image screen. Also, the display unit 110 of the present disclosure may display, on a photographed image screen, a focus mark that defines a focus area for executing focusing with respect to a photographed image, under a control of the controller 180.

The input unit 120 senses a user input, and executes a function of transferring an input signal corresponding to the user input to the controller 180. The input unit 120 may be configured to include any of the following elements which are not shown in FIG. 1, such as a key pad, a dome switch, a capacitive and/or resistive touch pad, a jog wheel, a jog switch, a finger mouse, a wheel, a hard key, and the like. Also, the input unit 120 may be configured to include any of the following elements which are not shown in FIG. 1, such as a touch sensor, a proximity sensor, an electromagnetic sensor, a pressure sensor, and the like. The input unit 120 may be provided as a virtual touch pad, when a touch panel of the electronic device 100 is provided in a form of a full touch screen and/or a partial touch screen. Also, when a touch panel is included in the display unit 110, the display unit 110 may operate as the input unit 120. In this case, an input signal for operating a terminal may be generated through the touch panel.

The input unit 120 according to the present disclosure may sense a user input for setting a photographing mode of the camera unit 150, a user input for requesting focusing, and a user input for requesting beginning of photographing.

The communication unit 130 executes communication by transmitting and receiving a wireless signal to/from a location external to the communication unit 130. The communication unit 130 according to the present disclosure may be configured to include a mobile communication module 131 and a Global Positioning Service (GPS) receiving module 132, but the communication unit 130 is not limited thereto and may include any other similar and/or suitable communication module for wired and/or wireless communication. For example, the communication unit may be configured to further include a wireless Internet module for wireless Internet connection and a satellite communication module.

The mobile communication module 131 transmits and receives a wireless signal to/from a base station, a server, and the like. The wireless signal may include data provided in various forms as a voice call signal, a video call signal, and a text/multimedia message is transmitted and received. The GPS receiving module 132 receives a GPS satellite signal from a GPS satellite, and transfers the received GPS satellite signal to the controller 180, under a control of the controller 180. The controller 180 may calculate location information associated with a location where the terminal 100 is currently located, using a GPS satellite signal.

The audio processing unit 140 may be formed of a coder/decoder (codec), and the codec may be formed of a data codec, that processes packet data and the like, and an audio codec, that processes an audio signal such as a voice and the like. The audio processing unit 140 converts a digital audio signal into an analog audio signal through the audio codec and plays back the analog audio signal through a Speaker (SPK), and converts an analog audio signal input through a Microphone (MIC) into a digital audio signal through the audio codec.

In the present disclosure, the audio processing unit 140 supports a sensor function that collects and measures an ambient sound. For example, when the audio processing unit 140 collects an ambient audio signal through a MIC when the camera unit 150 is driven, the audio processing unit 140 may transfer the collected audio signal to the controller 180. The controller 180 determines whether a voice signal exists among the collected audio signal, and when it is determined that a voice signal exists, the controller 180 may measure a direction and a distance to a subject corresponding to and/or generating the voice signal using a triangulation scheme.

The camera unit 150 is driven under a control of the controller 180, and executes a function of collecting an image by photographing a subject. The camera unit 150 may be activated based on a signal generated from the input unit 120, and may collect an image. The camera unit 150 may be configured to include at least one of the following elements, which are not shown in FIG. 1, such as a camera sensor, an image signal processor that converts an optical signal into an electric signal, a digital signal processor that executes image processing, such as scaling, removing noise, Red Green Blue (RGB) signal converting, or the like, of a video signal output from the image signal processor so as to display the video signal, and the like. Here, the camera sensor may be at least one of a Charge-Coupled Device (CCD) sensor, a Complementary Metal-Oxide Semiconductor (CMOS) sensor, or any other similar and/or suitable camera and/or image sensor. The camera unit 150 may be configured to include a first camera, which may be a front side camera, for photographing a picture in a self-mode, and a second camera, which may be a back side camera, for photographing a subject located in front of a user. The controller 180 may control the display unit 110 so as to display an image collected through the camera unit 150 as a preview image.

Also, as a request for execution of photographing is generated, the controller 180 photographs an image collected through the camera unit 150 at a point in time corresponding to the generation of the request for execution of photographing, and the camera unit 150 generates an image. The generated image may be temporarily and/or permanently stored in the storage unit 170. The sensor unit 160 senses and collects information on a change in a user input and a change in an ambient environment, and executes a function of transferring the information to the controller 180. In the present disclosure, the sensor unit 160 collects senor information associated with a change in a magnetic field, gravity, a pressure, a temperature, humidity, a quantity of light, a sound, and the like, so as to determine a current state of the electronic device 100.

The sensor unit 160 may be configured to include various sensors that are not shown in FIG. 1, for example, a touch sensor that recognizes a touch input, a proximity sensor that senses a proximity of an external object or a user input instrument, a distance measuring sensor, an image sensor that collects an image, a motion recognition sensor that recognizes a motion and a movement in a three-Dimensional (3D) space, a direction sensor that senses a direction and the like, an acceleration sensor that detects a moving speed, and the like, and any other similar and/or suitable sensor. The electronic device 100 according to the present disclosure may not be limited by a configuration of the sensor unit 160, and a MIC that collects an audio signal and/or a communication module may also execute a function of the sensor unit 160.

Also, in the electronic device 100 according to the present disclosure, a sensing processing module 171 may detect feature information through collected sensor information, such as an eye pattern recognition algorithm that may recognize a direction at which a user gazes, a sound localization algorithm, a symbol recognition algorithm, a facial recognition algorithm, an edge detection algorithm, and the like.

The sensor unit 160 according to the present disclosure may be activated to collect ambient environment information and to transfer the collected information to the controller 180, under a control of the controller 180, when the camera unit 150 is driven. The controller 180 may determine at least one focusing sensor, or in other words, the controller 180 may select at least one sensor to be the at least one focusing sensor, based on sensor information and a photographing mode.

The storage unit 170 stores various data and the like generated in the electronic device 100, in addition to an Operating System (OS) of the electronic device 100 and various applications, which may be referred to as apps. The data may include data generated from execution of an application, which may be referred to as an app, of the electronic device 100, and all types of storable data that may be generated using a portable terminal and/or storable data that may be received from an outside source, for example, an external server, another portable terminal, a personal computer, or any other similar and/or suitable outside and/or external source. The storage unit 170 may store a user interface provided in the electronic device 100 and various setting information associated with processing functions of a portable terminal. In the storage unit 170, programs and/or commands for the electronic device 100 may be stored. The controller 180 may execute the programs and/or commands stored in the storage unit 170.

The storage unit 170 may include at least one type of storage medium, which may be a non-volatile computer readable storage medium, from among a flash memory type, a hard disk type, a multimedia card micro type, a card type of memory, for example, a Secure Digital (SD) memory, an xD memory, or the like, a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, or any other similar and/or suitable storage medium.

According to an embodiment of the present disclosure, the storage unit 170 may temporarily and/or permanently store an image collected through the camera unit 150. Also, the storage unit 170 may temporarily and/or permanently store a picture and/or a video generated in response to a request for execution of photographing. The storage unit 170 may store information associated with a picture and/or information to be associated with the picture, for example, time information associated with a time where the picture is photographed, location information, information associated with a mode set for a camera when the picture is photographed, pixel information, and the like.

The storage unit 170 according to the present disclosure may be configured to include a plurality, i.e., more than one of the sensing processing module 171 that may detect feature information through collected sensor information, such as an eye pattern recognition algorithm that may recognize a direction in which a user gazes, a sound localization algorithm, a symbol recognition algorithm, a facial recognition algorithm, an edge detection algorithm, and the like.

The controller 180 controls general operations of the electronic device 100, controls a signal flow among internal components of the electronic device 100, and executes a function of processing data. The controller 180 may control supplying of power from a battery to internal components of the electronic device 100. When power is supplied, the controller 180 controls a boot process of the electronic device 100, and executes various application programs stored in a program area for executing a function of the electronic device 100, based on settings of a user.

In the present disclosure, the controller 180 may be configured to include a sensor information collecting unit 181, a sensor determining unit 182, and a focusing unit 183.

The sensor information collecting unit 181 is connected with the sensor unit 160, the communication unit 130, the audio processing unit 140, the storage unit 170, and the camera unit 150, and may activate a plurality of sensors supported in a terminal, such as the electronic device 100, when the camera unit 150 is driven, so as to collect sensor information of the sensors. It is preferable that the sensor information includes first sensor information that may be collected through the camera unit 150, a MIC, the communication unit 130, the sensor unit 160, and the like, and second sensor information that may be collected through the sensing processing module 171 based on the collected first sensor information, such as face detection, voice detection, outline information, and the like. Here, the collected sensor information may be different based on a type of an electronic device and an ambient environment.

The sensor determining unit 182 may determine at least one auto-focusing sensor based on sensor information collected through the sensor information collecting unit 181 and a photographing mode. The auto-focusing sensor may include at least a direction measuring sensor that determines a direction of a subject and a distance measuring sensor that determines a distance to a subject. The sensor determining unit 182 may calculate an accuracy point of sensor information for each collected sensor and a weight associated with a photographing mode and may determine a sensor having the highest value to be an auto-focusing sensor, however, the present disclosure is not limited thereto and other similar and/or suitable methods of determining the auto-focusing sensor may be used.

The focusing unit 183 focuses on a subject by using a direction measuring sensor (not shown) and a distance measuring sensor (not shown) determined by the sensor determining unit 180. For example, the focusing unit 183 may determine a direction in which the camera unit 150 aims, or in other words, a direction in which the camera unit 150 is pointed, using the distance measuring sensor, and may determine a direction of a subject based on the direction in which the camera 150 aims. The focusing unit 183 may set a Region Of Interest (ROI) for focusing on a direction of a subject. The focusing unit 183 may execute focusing by determining a distance from the set ROI to the subject, using the distance measuring sensor.

Hereinafter, detailed functions of the controller will be described with reference to FIGS. 2 through 4.

With the tendency of digital devices for convergence, there are many various modifications of a digital device to enumerate. The electronic device 100 may be configured by omitting or replacing predetermined components in the described configuration based on a type of the device provided.

Figure 2:
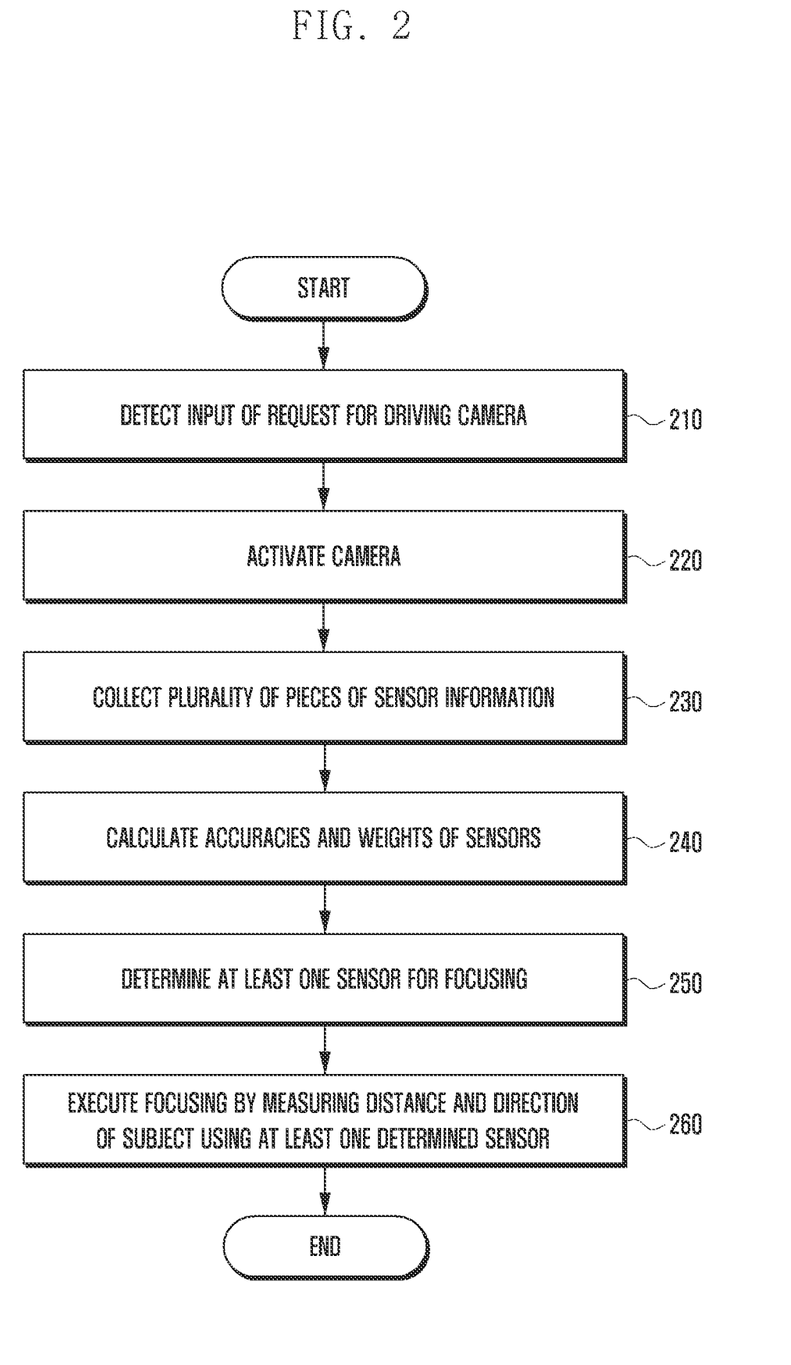
FIG. 2 is a flowchart illustrating an auto-focusing method of an electronic device according to an embodiment of the present disclosure.

FIG. 2 is a flowchart illustrating an auto-focusing method of an electronic device according to an embodiment of the present disclosure.

Referring to FIG. 2, the electronic device 100 detects a user input for driving a camera, such as the camera unit 150, and/or driving a camera application in operation 210. In operation 220, the electronic device 100 activates, i.e. turns on, the camera unit 150. In this process, the electronic device 100 may display a preview image collected through the camera unit 150 in the display unit 110. In operation 230, when the camera unit 150 is activated, the electronic device 100 collects a plurality of pieces of sensor information using a configuration supported in the electronic device 100 and sensing programs. Here, it is preferable that the sensor information includes sensor information collected through the camera unit 150, a MIC, the communication unit 130, the sensor unit 160, and the like, and also includes sensor information collected through the sensing processing module 171 based on information collected through the components, such as face detection, voice detection, edge detection, for example, outline information, symbol recognition, direction recognition, location measurement, movement recognition, motion recognition, and the like.

For example, when the camera unit 150 is activated, the electronic device 100 may collect ambient luminance information, that is, information associated with a quantity of light, through a sensor that senses light, audio information collected through a MIC, location information of a terminal, and the like. Also, the electronic device 100 may collect sensor information needed for using an eye pattern recognition algorithm, a sound localization algorithm, a symbol recognition algorithm, a face recognition algorithm, an edge detection algorithm, and any other similar and/or suitable algorithm used by the electronic device 100.

In operation 240, the electronic device 100 analyzes the collected sensing information and calculates accuracies and weights of sensors, or in other words, calculates an accuracy point and a weight of each sensor. Here, the accuracy point indicates a numerical value calculated based on ambient environment information, and the weight indicates a numerical value assigned for each sensor based on a photographing mode of a photographing device.

For example, when a photographing environment is dark, an accuracy of sensor information collected through an image sensor may be low. Further, since the accuracy of the image sensor is low, there may be difficulty in collecting sensor information through a face recognition algorithm and an eye pattern recognition algorithm that uses image sensor information. In this case, the electronic device 100 may calculate accuracies and weights of other sensors, excluding sensors that use an image sensor, to be relatively higher.

In operation 250, the electronic device 100 may determine at least one sensor for focusing, or, in other words, may determine at least one focusing sensor optimized for a photographing environment and a photographing mode based on accuracies and weights of sensors. Here, the at least one focusing sensors may include at least one of a direction measuring sensor (not shown) for measuring a direction of a subject and a distance measuring sensor (not shown). Here, the photographing mode may include a still image photographing mode, such as a picture photographing mode, and a video photographing mode. The direction measuring sensor and the distance measuring sensor may be different from each other or may be identical to each other, and this may not be limited thereto.

The photographing mode of the electronic device 100 may be a picture photographing mode as opposed to a video photographing mode, and an ambient environment and a weight of each sensor is different for each photographing mode and thus, sensors determined for measuring a sound and a direction for each photographing mode may be different from a video photographing mode.

For example, when a user photographs a video with an electronic device that is not equipped with a communication modem in an environment where it is dark and free of noise, the electronic device determines a stereo microphone sensor as a direction measuring sensor and also determines a stereo microphone sensor as a distance measuring sensor since a quantity of light is insufficient due to the dark environment and the lack of noise. In a case where the photographing mode of the camera is the video photographing mode and thus, there is a high probability that a subject generally exists in a direction from which a sound is heard, and thus, it may be construed to be a case in which a weight of a microphone sensor is calculated to be high in a photographing mode.

Here, the stereo microphone sensor may calculate a direction and a distance to the subject using a triangulation scheme. Also, when a user photographs a still image, for example, a picture, with an electronic device that is not equipped with a communication modem in an environment where it is dark and free of noise, the electronic device may determine a symbol recognition algorithm to be a distance measuring sensor. For example, in a video photographing mode, an image of a supplementary light that is shone may be included in an image and thus, there may be difficulty in using the supplementary light. However, in a still image, a subject desired to be photographed may be different from a subject that transfers a voice, and it may be possible that an electronic device shines a predetermined image pattern on the subject through the supplementary light. Therefore, in the sill image photographing mode, using the supplementary light is more useful for executing focusing and thus, in the still image photographing mode, a symbol recognition sensor may be selected to be a focusing sensor for measuring a distance and a stereo microphone sensor may be determined to be a focusing sensor for measuring a direction. An algorithm for measuring a distance to the subject using the symbol recognition sensor may measure a direction of the subject through a microphone sensor first, may set the corresponding direction to be an ROI, and may shine the supplementary light to the corresponding direction. Subsequently, the electronic device may be aware of a size of a symbol, and a size of the subject is inversely proportional to a distance between the electronic device and the subject and thus, the electronic device may measure the distance to the subject using the same.

In operation 260, the electronic device 100 focuses on the subject using the at least one determined auto-focusing sensor, or in other words, the electronic device 100 executes focusing by measuring a distance to and a direction of a subject using the at least one determined sensor. Hereinafter, a focusing method will be described in detail with reference to FIG. 3.

Figure 3:
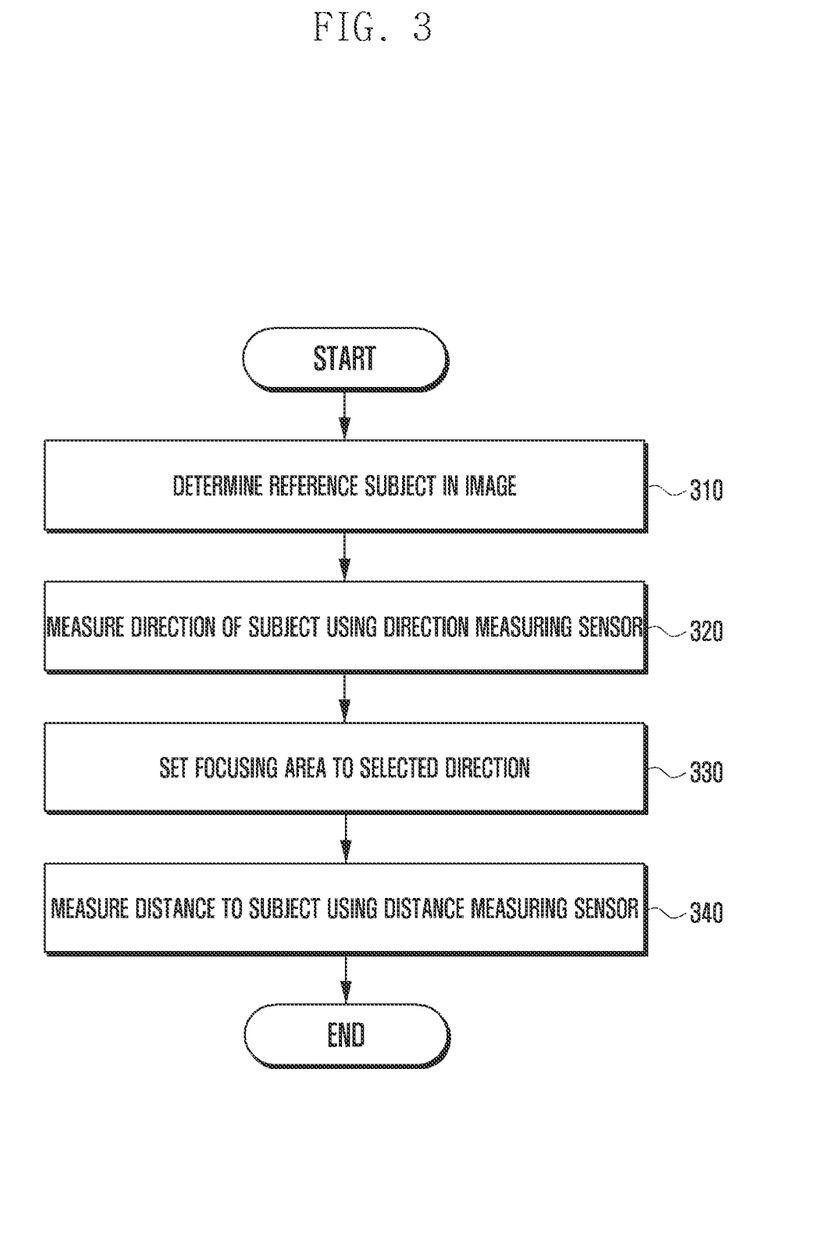
FIG. 3 is a flowchart illustrating an auto-focusing method according to an embodiment of the present disclosure.

FIG. 3 is a flowchart illustrating an auto-focusing method according to an embodiment of the present disclosure.

Referring to FIG. 3, the electronic device 100 determines a reference subject in an image collected through a camera, such as the camera unit 150, in operation 310. Here, the subject may be construed to be a target for which a decision associated with focusing is made, or in other words, the determined reference subject in an image may be used as a target corresponding to the auto-focusing method. For example, the electronic device 100 may use various decision algorithms to decide the reference subject. For example, the electronic device 100 may use an algorithm that extracts an outline of a subject using a grade of a brightness, a color, a chroma, and the like and a continuity of the grade. In this example, the subject may include a subject having a clear outline and a subject that does not have a clearly outstanding outline, such as a landscape. When the subject having a clear outline exists, the electronic device 100 may determine the subject having the clear outline to be the reference subject which is used as a reference for focusing.

Alternatively, the electronic device 100 may use an algorithm that calculates a similarity of a brightness, a color, a chroma, and the like, and extracts only an area having a similar characteristic to be a subject. Also, the electronic device 100 may detect a facial area from an image as a subject and may recognize the subject. The face detection operation may be executed together with an auto facial recognition function of a camera. When the electronic device 100 fails to recognize or extract a subject in an image, the electronic device 100 may determine a central area of the image to be the reference subject which is a target for which a decision associated with focusing is made.

In operation 320, the electronic device 100 determines the subject to be the target for which a decision associated with focusing is made, and determines and/or measures a direction of the subject using the direction measuring sensor determined in operation 250 of FIG. 2.

For example, when the electronic device 100 is equipped with a stereo microphone, a direction and/or a distance to the subject may be determined based on a triangulation scheme using the sound localization algorithm. Alternatively, when the subject is a person and the person is equipped with a terminal including a communication device, the electronic device 100 may recognize location information of the terminal of the person corresponding to the subject, so as to determine a direction of the subject.

In operation 330, the electronic device 100 sets an ROI for focusing, that is, the electronic device 100 sets a focusing area to a selected direction where the subject exists, when the direction of the subject is determined. Here, the electronic device 100 may output a focus mark indicating the set ROI on a predetermined position of a preview image. Here, the electronic device 100 executes graphics processing, with respect to a focus mark, differently based on whether focusing is completed, and outputs a state in which focusing is completed and a state in which focusing is incomplete to be distinguished. The ROI corresponds to an area that provides a reference for refocusing and an area that provides a reference for sensing a movement of a subject.

In operation 340, the electronic device 100 may determine a distance from the ROI to the subject using the distance measuring sensor determined in operation 250 of FIG. 2, or in other words, the electronic device 100 may measure a distance to the subject using the distance measuring sensor, so as to complete an operation of focusing on the subject.

For example, the electronic device 100 may measure a time that it takes for an infrared light and/or an ultrasonic wave emitted from the electronic device 100 to return back through reflection from the subject, so as to determine the distance to the subject. Alternatively, when the subject is recognized through the facial recognition, the electronic device 100 may determine the distance to the subject based on a size of the subject in an image, a ratio of the subject to the image, and the like. Also, the electronic device 100 may measure the distance to the subject using a symbol recognition sensor. In this case, the electronic device 100 may measure a direction of the subject through a microphone sensor, may set the corresponding direction to be an ROI, and may shine a supplementary light in the corresponding direction. Subsequently, the electronic device 100 may be aware of a size of a symbol, and a size of the subject is inversely proportional to a distance between the electronic device 100 and the subject and thus, the electronic device 100 may measure the distance to the subject using the same.

Figure 4:
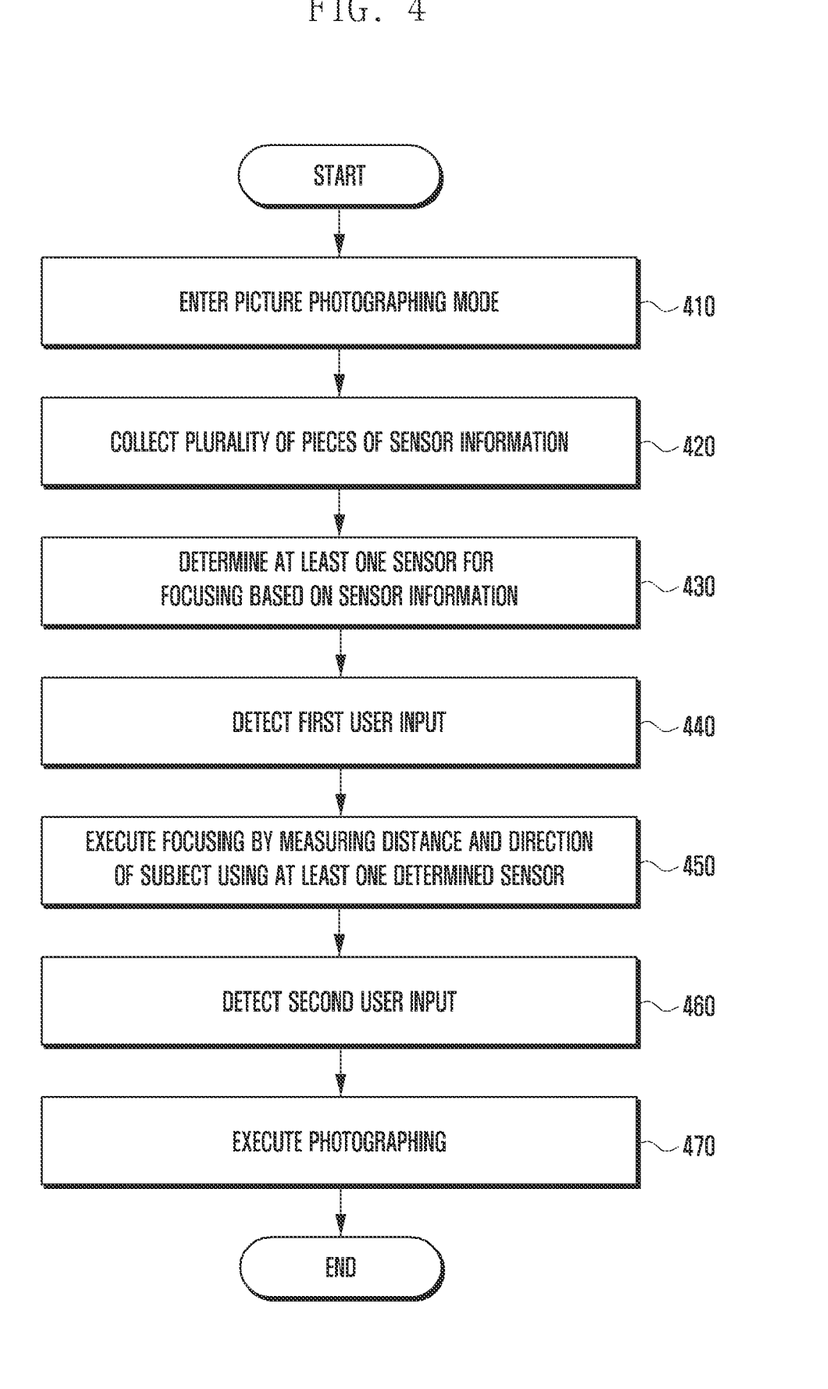
FIG. 4 is a flowchart illustrating an auto-focusing method of an electronic device according to an embodiment of the present disclosure.

FIG. 4 is a flowchart illustrating an auto-focusing method of an electronic device according to another embodiment of the present disclosure.

Referring to FIG. 4, in operation 410, the camera unit 150 is driven according to a user input and/or a predetermined schedule and the electronic device 100 enters a picture photographing mode. The electronic device 100 according to the present disclosure may support a half-press shutter function. In this process, the electronic device 100 may display a preview image collected through the camera unit 150 in the display unit 110.

In operation 420, when the camera unit 150 is activated, the electronic device 100 collects a plurality of pieces of sensor information using a configuration supported in the electronic device 100 and sensing programs. Subsequently, the electronic device 100 analyzes the collected sensing information and calculates an accuracy point and a weight of each sensor. Here, the accuracy point indicates a numerical value calculated based on ambient environment information, and the weight indicates a numerical value assigned for each sensor based on a photographing mode of the electronic device 100.

In operation 430, the electronic device 100 may determine at least one focusing sensor optimized for a photographing environment and a photographing mode based on accuracy points and weights of sensors, or in other words, the electronic device 100 may determine at least one sensor for focusing based on sensor information. Here, the focusing sensors include at least a direction measuring sensor for measuring a direction of a subject and a distance measuring sensor. The direction measuring sensor and the distance measuring sensor may be different from each other and may be identical to each other, however, the present disclosure is not limited thereto.

In operation 440, the electronic device 100 detects a first user input that requests execution of the half-press shutter function. Here, the first user input may be an input of pressing a shutter button or a half-pressing of the shutter button, as supported in the electronic device 100, with a first pressure. In operation 450, the electronic device 100 executes focusing by determining and/or measuring a direction and a distance to the subject using at least one determined sensor, which may be the determined focusing sensor, in response to the first user input. The electronic device 100 may output information associated with focusing to the display unit 110 as a preview image screen. When a focusing operation is completed, the electronic device 100 may be operated in a focusing lock state (AF Lock) while a user inputs a half-press shutter button. In this example, the user may determine whether focusing on the subject is executed, through a preview screen.

In operation 460, the electronic device 100 may detect a second user input that requests photographing a picture. Here, the second user input may be an input of pressing a shutter button with a second pressure which is relatively greater than the first pressure. In operation 470, the electronic device 100 executes photographing in order to photograph a picture of the subject in response to the second user input.

Figure 5:
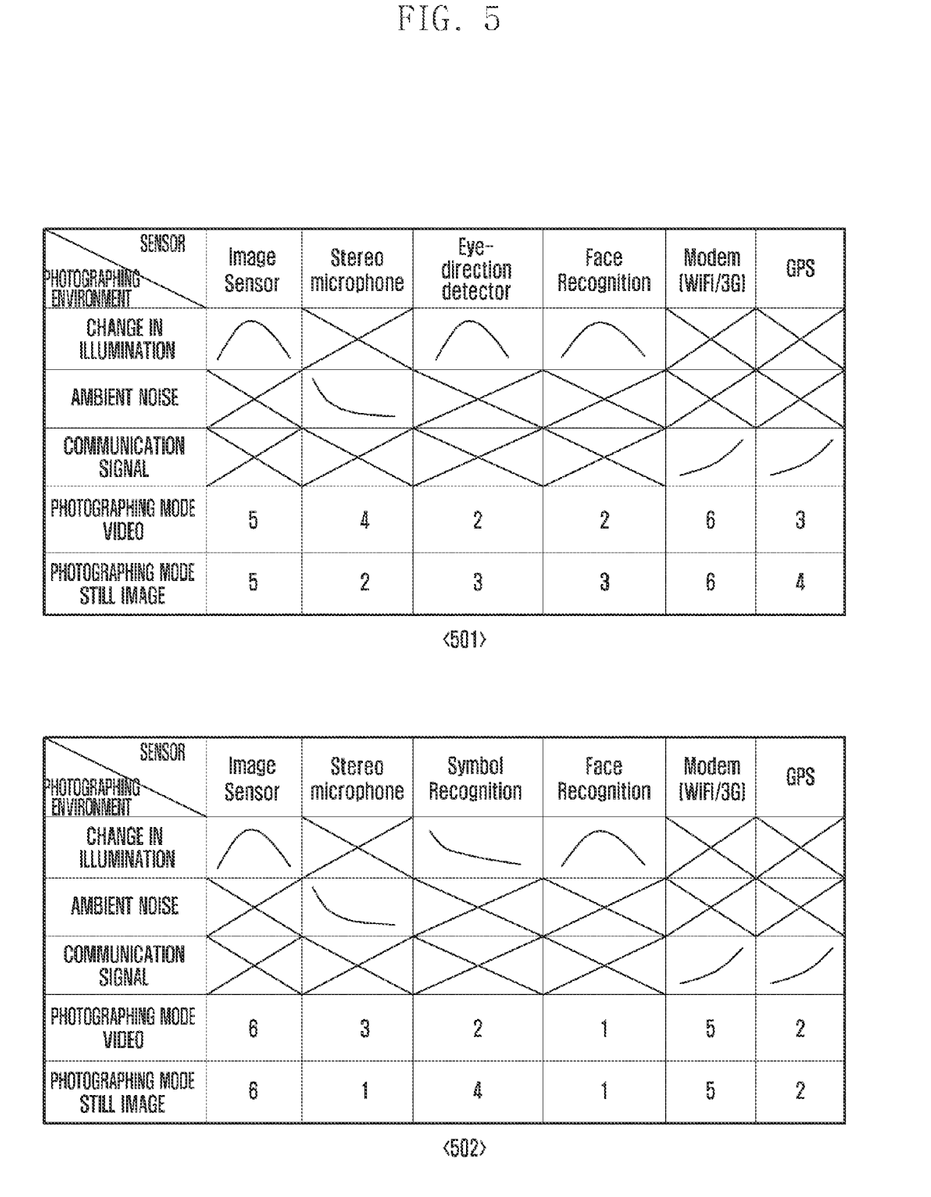
FIG. 5 illustrates diagrams for describing a candidate group of focusing sensors according to an embodiment of the present disclosure.

FIG. 5 illustrates diagrams for describing a candidate group of focusing sensors according to an embodiment of the present disclosure.

Referring to FIG. 5, an electronic device according to the present disclosure calculates an accuracy of a sensor based on a change of a photographing environment, assigns a weight based on a photographing mode, and supports a function of determining a focusing sensor based on a photographing environment, so as to select a sensor optimized for the photographing environment when a camera executes photographing.

For example, the diagram 501 is a table including accuracies of sensors for selecting a subject direction measuring sensor from among focusing sensors, and "a line" included in the table of FIG. 5 may be construed to be an accuracy point of each sensor based on a photographing environment. The electronic device 100 may select, as a candidate group, sensors that are capable of measuring a direction from among sensors supported in the device. For example, a candidate group of direction measuring sensors may include an image sensor, a microphone, an eye recognition detection processing module, a facial recognition processing module, a communication module, and the like. The direction measuring sensors may collect sensor information based on a change of an environment, such as a change in illumination, ambient noise, and a communication signal. The electronic device 100 calculates a point based on sensor measurement accuracy, which is based on the collected sensor information.

For example, as illustrated in the diagram 501, an eye pattern recognition algorithm and a facial recognition algorithm may be operated based on the information collected through the image sensor, and an accuracy of measured sensor information may be deteriorated based on a change in illumination, that is, when illumination is significantly high or low. That is, when ambient illumination is significantly high or low, the electronic device 100 sets an accuracy point of image sensor information to "0", and when illumination is appropriate, the electronic device 100 sets an accuracy point of the image sensor to be the highest point. Also, when provided with a communication modem and a Global Positioning System (GPS) receiving module sensors that may not be affected by a change of illumination, the electronic device 100 may reflect them and may set the accuracy point to a constant value irrespective of a change of an environment.

Subsequently, the electronic device 100 calculates a weight value based on a photographing mode for each sensor. The weight value based on the photographing mode may indicate a value in an ideal environment, for example, a value in a case where photographing is executed in a state in which all of the sensors supported in a device are available for use. The electronic device 100 may select, as a direction measuring sensor, a sensor having the highest point obtained by multiplying an accuracy point and a weight value.

The electronic device 100 may select a focusing sensor using the following Equation 1.

$$\mathrm{MAX}(\mathrm{point})_{i=1}{}^{n}=X_{e}W_{m} \quad \text{Equation 1}$$

Here, $X_e$ denotes an accuracy point of a sensor in a photographing environment, $W_m$ denotes a weight value of a corresponding sensor based on a photographing mode, and n denotes a total number of sensors supported in an electronic device.

For example, a diagram 502 is a table including accuracies of sensors for selecting a subject distance measuring sensor from among focusing sensors, and "a line" included in the table of FIG. 5 may be construed to be an accuracy of each sensor based on a photographing environment. It may be recognized that a candidate group of distance measuring sensors and a candidate group of direction measuring sensors are determined to be different through comparing the diagram 501 and the diagram 502.

For example, a gaze detection sensor may be appropriate for measuring a direction of a subject, whereas it may be inappropriate for measuring a distance. Conversely, a symbol recognition sensor may be appropriate for measuring a distance to a subject, whereas it may be inappropriate for measuring a direction of the subject. Therefore, a weight of each sensor in an algorithm for selecting distance measuring sensors may be configured to be different from a case of calculating a weight of a direction measuring sensor. As described in the diagram 501, the electronic device 100 may calculate accuracies and weights of distance measuring sensors, and may select a sensor having the highest point obtained by multiplying an accuracy point and a weight value to be a distance measuring sensor.

A description will be made through a concrete example. When a terminal, such as the electronic device 100, is operated in a video photographing mode, the terminal selects a communication modem as a direction measuring sensor, and selects an image sensor as a distance measuring sensor. For example, when a subject is equipped with a portable terminal including a communication device, such as the electronic device 100 including the communication unit 130, a direction of photographing the subject may be sensed by recognizing a location of the portable terminal of the subject. Also, the terminal measures a signal of the portable terminal of the subject so as to sense a direction, and measures a distance using an image sensor since a quantity of light is sufficient and thus, a time for focusing may be reduced. Conversely, when the subject is not a person and/or does not have the portable terminal equipped with a communication device, the direction of the subject may be sensed by detecting a gaze of a person who executes photographing through an image sensor. Also, when the distance to the subject is far, the distance may be measured using a GPS receiving unit and MAP information associated with a neighboring area.

Conversely, when the terminal is operated in a picture photographing mode, a quantity of light is sufficient and thus, a communication modem and an image sensor may be determined to be focusing sensors in the same manner as the video photographing mode. When the subject is a person and is equipped with the portable terminal including the communication modem, the terminal senses a direction of the subject and sets an ROI in a preview mode, and calculates a distance to the subject using the image sensor at a point in time when a user half-presses a shutter button so as to focus on the subject.

As described above, according to the present disclosure, at least one focusing sensor is determined according to a photographing environment, a characteristic of a sensor, and a photographing mode, and focusing on a subject may be executed using the determined focusing sensors. That is, according to the present disclosure, focusing is executed by variously changing focusing sensors based on sensor information of sensors and thus, focusing on a desired subject may be promptly and accurately executed in an environment where focusing is difficult.

While the present disclosure has been described with reference to various embodiments thereof, it will be understood by those skilled in the art that various changes in form and details may be made therein without departing from the spirit and scope of the present disclosure as defined by the appended claims and their equivalents.

What is claimed is:

1. A method for auto-focusing of an electronic device, the method comprising:
   collecting sensor information using a plurality of sensors of the electronic device when a camera of the electronic device is driven,
   selecting a first sensor for determining a direction of a subject and a second sensor for determining a distance to the subject among the plurality of sensors based on the collected sensor information,
   obtaining a first information from the selected first sensor and a second information from the selected second sensors, and
   focusing on the subject located in an image collected from the camera using the obtained first information and second information,
   wherein the collected sensor information comprises at least one of a photographing environment, a characteristic of a sensor, or a photographing mode, and
   wherein the selecting of the first sensor and the second sensor comprises:
      calculating an accuracy point and a weight of each of the plurality of sensors based on the collected sensor information, and
      selecting, as at least one focusing sensor, the first sensor and the second sensor among the plurality of sensors, having a highest value based on the calculated accuracy point and weight.

2. The method of claim 1, wherein the focusing on the subject comprises:
   determining a reference subject in the image collected from the camera,
   determining a direction of the reference subject using the first sensor,
   setting a region of interest (ROI) for executing re-focusing with respect to the direction of the reference subject, and
   executing focusing by determining a distance from the ROI to the reference subject using the first sensor.

3. The method of claim 1, wherein the calculating of the accuracy point and the weight of the sensor information comprises:
   calculating the accuracy point of the collected sensor information according to photographing environment information, and
   calculating the weight of the sensor information according to a photographing mode of the camera.

4. The method of claim 1, wherein the sensor information comprises:
   at least one first sensor information that is collected from among a quantity of light, an image, a speed, a sound, and a location, and
   at least one second sensor information that is collected from among motion recognition, movement recognition, facial recognition, voice detection, edge detection, symbol recognition, direction recognition, and location measurement, by processing the first sensor information.

5. The method of claim 1, wherein the focusing on the subject comprises executing focusing when both the camera supports a half-press shutter function and a user input that requests execution of the half-press shutter function is detected.

6. The method of claim 1, wherein the plurality of sensors includes at least one of a touch sensor that recognizes a touch input, a proximity sensor that senses a proximity of an external object, a distance measuring sensor, an image sensor that collects an image, a motion recognition sensor that recognizes a motion and a movement in a three-Dimensional (3D) space, a direction measuring sensor that senses the direction of the subject, or an acceleration sensor that detects a moving speed.

7. The method of claim 1, further comprising:
detecting feature information from among the collected sensor information,
wherein the feature information comprises at least one of an eye pattern recognition information indicating a direction at which a user gazes, sound localization information, symbol recognition information, facial recognition information, or edge detection information.

8. An electronic device comprising:
a camera configured to collect an image including a subject;
a sensor configured to collect photographing environment information, and to collect a plurality of pieces of sensor information by processing the photographing environment information when the camera is driven; and
at least one processor configured to:
collect sensor information using a plurality of sensors of the electronic device when the camera of the electronic device is driven,
select a first sensor for determining a direction of a subject and second sensor for determining a distance to the subject among the plurality of sensors, based on the collected sensor information,
obtain a first information from the selected first sensor and a second information from the selected second sensor, and
focus on the subject located in an image collected from the camera using the obtained first information and second information,
wherein the collected sensor information comprises at least one of a photographing environment, a characteristic of a sensor, or a photographing mode, and
wherein the at least one processor is further configured to:
calculate an accuracy point and a weight of each of the plurality of sensors based on the collected sensor information, and
select, as at least one focusing sensor, the first sensor and the second sensor, from among the plurality of sensors, having a highest value based on the calculated accuracy point and the weight.

9. The electronic device of claim 8, wherein the at least one processor is further configured to:
determine a reference subject in the image collected from the camera,
set a region of interest (ROI) for executing re-focusing with respect to the direction of the reference subject, and
execute focusing by determining a distance from the ROI to the reference subject using the first sensor.

10. The electronic device of claim 8, wherein the at least one processor is further configured to:
calculate an accuracy point of the collected sensor information according to photographing environment information, and
calculate the weight of the sensor information according to a photographing mode of the camera.

11. The electronic device of claim 8, wherein the sensor information comprises:
at least one first sensor information that is collected from among a quantity of light, an image, a speed, a sound, and a location, and
at least one second sensor information that is collected from among motion recognition, movement recognition, facial recognition, voice detection, edge detection, symbol recognition, direction recognition, and location measurement by processing the first sensor information.

12. The electronic device of claim 8, wherein the at least one processor is further configured to control the focusing on the subject when both the electronic device supports a half-press shutter function and a user input that requests execution of the half-press shutter function is detected.

13. The electronic device of claim 8, wherein the at least one processor is further configured to:
detect a sound of a subject using a stereo microphone, and
measure a distance to the subject using a triangulation scheme.

14. The electronic device of claim 8, wherein, when a location of another communication terminal is determined to be within an interval defined in advance, the at least one processor is further configured to calculate the location of the other communication terminal so as to measure a direction and a distance of the subject.

15. The electronic device of claim 8, wherein, when the electronic device is equipped with two photographing devices, the at least one processor is further configured to execute recognition of an eye pattern so as to set a region of interest (ROI) based on a gaze of an eye of a person who executes photographing by the electronic device.

16. The electronic device of claim 8, wherein the sensor comprises:
a plurality of sensors including at least one of a touch sensor that recognizes a touch input,
a proximity sensor that senses a proximity of an external object,
a distance measuring sensor,
an image sensor that collects an image,
a motion recognition sensor that recognizes a motion and a movement in a three-Dimensional (3D) space,
a direction sensor that senses a direction, and
an acceleration sensor that detects a moving speed.

17. The electronic device of claim 8,
wherein the at least one processor is further configured to detect feature information from among the collected sensor information, and
wherein the feature information comprises at least one of an eye pattern recognition information indicating a direction at which a user gazes, sound localization information, symbol recognition information, facial recognition information, and edge detection information.

* * * * *